United States Patent
Johnson et al.

(10) Patent No.: US 9,406,325 B2
(45) Date of Patent: Aug. 2, 2016

(54) SLIDER CLEANING AND CARRIER TRAY

(71) Applicant: Seagate Technology LLC, Cupertino, CA (US)

(72) Inventors: Glenn Charles Johnson, St. Paul, MN (US); Binh Dinh Tran, St. Paul, MN (US); Gary Singer, Northfield, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 3 days.

(21) Appl. No.: 13/954,390

(22) Filed: Jul. 30, 2013

(65) Prior Publication Data

US 2015/0034526 A1 Feb. 5, 2015

(51) Int. Cl.
*B65D 85/00* (2006.01)
*G11B 5/41* (2006.01)

(52) U.S. Cl.
CPC ........................................ *G11B 5/41* (2013.01)

(58) Field of Classification Search
CPC ................ H01L 21/67333; B65D 21/0204; H05K 13/0084; A61N 1/046; A61N 1/0472; A61N 1/048; A61N 1/18; G11B 5/41
USPC ......... 206/701, 713–717, 724, 725, 562, 564; 220/23.4, 23.6
See application file for complete search history.

(56) References Cited

U.S. PATENT DOCUMENTS

| | | | |
|---|---|---|---|
| 5,492,223 A * | 2/1996 | Boardman et al. | 206/710 |
| 5,988,394 A * | 11/1999 | Emoto et al. | 206/724 |
| 6,109,445 A | 8/2000 | Beyer | |
| 6,227,372 B1 | 5/2001 | Thomas et al. | |
| 6,357,595 B2 * | 3/2002 | Sembonmatsu | H01L 21/67333 206/564 |
| 6,857,524 B2 | 2/2005 | Duban-Hu et al. | |
| 6,926,937 B2 | 8/2005 | Extrand et al. | |
| 6,938,774 B2 | 9/2005 | Extrand | |
| 7,108,899 B2 | 9/2006 | Extrand et al. | |
| 2002/0066472 A1 | 6/2002 | Sonoda et al. | |
| 2006/0060496 A1 | 3/2006 | Adams et al. | |
| 2008/0087298 A1 | 4/2008 | Katou et al. | |
| 2008/0237158 A1 | 10/2008 | Yoshida | |

OTHER PUBLICATIONS

"Read-Write Trays : 2 Process/Wash Trays", printed from Internet website www.diskcare.com on Jun. 11, 2013.
"Read-Write Trays : 2 Shipping Trays", printed from Internet website www.diskcare.com on Jun. 11, 2013.

* cited by examiner

*Primary Examiner* — Anthony Stashick
*Assistant Examiner* — James M Van Buskirk
(74) *Attorney, Agent, or Firm* — HolzerIPLaw, PC

(57) ABSTRACT

A tray for retaining sliders, such as during washing and/or transporting process steps. The tray has a planar body comprising a top surface having a plurality of cavities therein, an opposite bottom surface having a plurality of recesses therein, and a perimeter. Each cavity is oppositely aligned with a respective recess, with each cavity and its respective recess connected by a passage through the body.

16 Claims, 5 Drawing Sheets

SLIDER CLEANING AND CARRIER TRAY

BACKGROUND

Hard disc drive systems (HDDs) typically include one or more data storage discs and a magnetic transducing head carried by a slider to read from and write to a data track on a disc.

The reduction of the disc drive size and increase of the storage capacity are continuous goals of the industry. If dust, a gasified organic matter or any other contaminant adheres to the magnetic head slider, the reliability of the disc drive may be deteriorated. Thus, high cleanliness is desired. Because of this, the magnetic head slider is subjected to thorough cleaning in the final manufacturing stage. Generally, the cleaning includes a step of washing off the contaminant adhering to the magnetic head slider with use of a cleaning solution, a rinsing step of washing off the adhering cleaning solution with rinsing liquid, and a drying step of drying the resulting adhering rinsing liquid. During this cleaning, the slider is secured in a cavity in a tray. Depending on the cleaning process and the subsequent process, the tray may be used as a carrier tray, to transport the slider to the subsequent process. Depending on the tray, the subsequent process, etc., the slider may be transferred to a different tray for transport.

The present disclosure provides a tray suitable for use as both a cleaning tray and a carrier tray.

SUMMARY

One particular embodiment of this disclosure is a tray for retaining sliders, the tray having a planar body comprising a top surface having a plurality of cavities therein, an opposite bottom surface having a plurality of recesses therein, and a perimeter. Each cavity is oppositely aligned with a respective recess, with each cavity and its respective recess connected by a passage through the body.

Another particular embodiment of this disclosure is a tray for sliders, the tray having a planar body comprising a top surface having a plurality of cavities therein, each cavity having a length no more than 1350 micrometers, a nominal width no more than 1350 micrometers, and a depth no more than 180 micrometers. The planar body also comprising an opposite bottom surface having a plurality of recesses therein, each recess having a length no more than 1350 micrometers, a width no more than 1350 micrometers, and a depth of at least 100 micrometers, each recess oppositely aligned with a respective cavity.

Another particular embodiment of this disclosure is a combination of a tray and at least one slider. The tray has a planar body comprising a top surface having a plurality of cavities therein, and an opposite bottom surface having a plurality of recesses therein, each cavity oppositely aligned with a respective recess, with each of the cavities having a nominal width, a length, and a depth. The at least one slider is positioned in one of the plurality of cavities, the slider being at least level with the top surface of the tray, in some embodiments, extending above the top surface of the tray.

Yet another particular embodiment of this disclosure is a stack of trays that includes a first tray comprising a planar body, a top surface having a plurality of cavities therein, an opposite bottom surface having a plurality of recesses therein, and a perimeter, with each recess oppositely aligned with a respective cavity, and a second tray comprising a planar body, a top surface having a plurality of cavities therein, an opposite bottom surface having a plurality of recesses therein, and a perimeter, with each recess oppositely aligned with a respective cavity. The second tray is stacked on the first tray in a manner such that the top surface of the second tray is adjacent the bottom surface of the first tray.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DETAILED DESCRIPTION

The present discussion is directed to trays having a plurality of cavities therein, for retaining a plurality of magnetic head sliders during a washing/cleaning process. The trays can also be used to store the sliders before and after the washing/cleaning process and during transport.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above those other elements.

Figure 1:
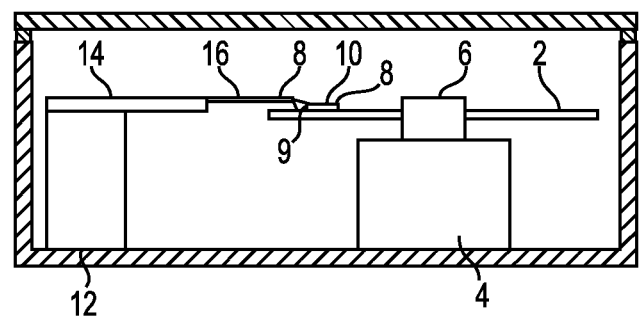
FIG. 1 is a sectional side view of a magnetic recording disc drive.
Figure 2:
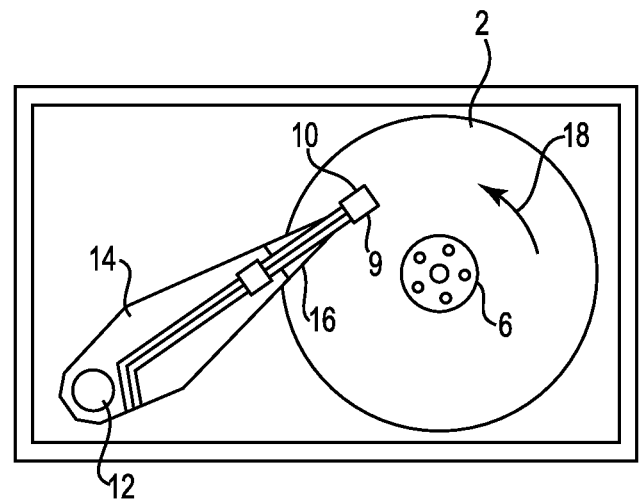
FIG. 2 is a top view of the magnetic recording disc drive of FIG. 1.

Referring to FIGS. 1 and 2, a generic magnetic recording disc drive is illustrated, having a magnetic recording disc 2 which is rotated by drive motor 4 with hub 6 which is attached to drive motor 4. A read/write head or transducer 8 is present on a trailing end or surface 9 of a slider 10. Slider 10 is connected to an actuator 12 by means of a rigid arm 14 and a suspension element 16. Suspension element 16 provides a bias force that urges slider 10 toward the surface of disc 2. During operation of the disc drive, drive motor 4 rotates disc 2 at a constant speed in the direction of arrow 18 and actuator 12, which is typically a linear or rotary motion coil motor, drives slider 10 generally radially across the plane of the surface of disc 2 so that read/write head or transducer 8 may access different data tracks on disc 2.

Typically, numerous sliders are fabricated from a single wafer (e.g., AlTiC wafer) having rows of magnetic transducer heads 8 deposited on the wafer surface using semiconductor-type process methods. The wafer, by a series of steps, is divided into individual sliders 10. Prior to attaching slider 10 to rigid arm 14 and suspension element 16, slider 10 is cleansed to remove any particulate and chemical contaminant (e.g., lubricant) that might be present on its surface. During the cleaning processes, a plurality of sliders 10 is positioned in a cavitied tray.

Sliders 10 often have side dimensions, for example, between 700 and 1250 micrometers, with a height of about 200 micrometers. Particular examples of slider sizes include 1235 micrometers by 770 micrometers with a thickness or height of 230 micrometers, 1235 micrometers by 700 micrometers with a thickness or height of 180 micrometers, and 850 micrometers by 700 micrometers with a thickness or height of 180 micrometers.

Figure 3:
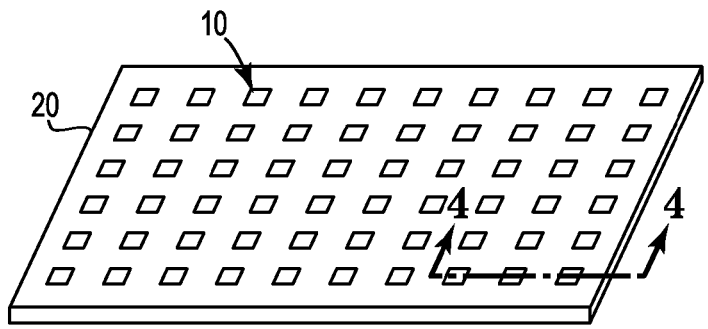
FIG. 3 is a schematic, perspective view of a plurality of sliders held in a tray.
Figure 4:
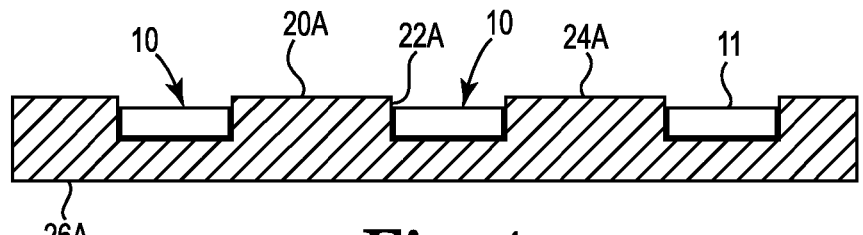
FIG. 4 is a cross-sectional view of the sliders and the tray taken along line 4-4 of FIG. 3.
Figure 5:
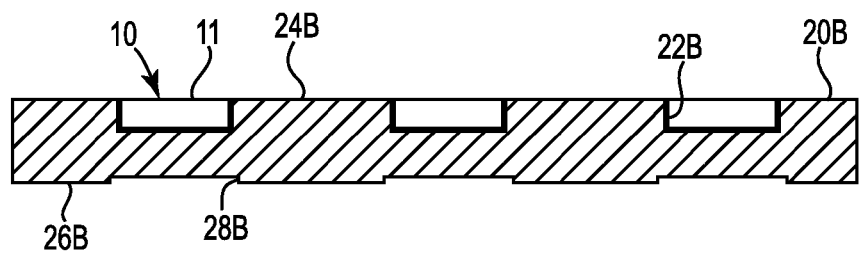
FIG. 5 is a cross-sectional view of sliders and an alternate embodiment of a tray.
Figure 6:
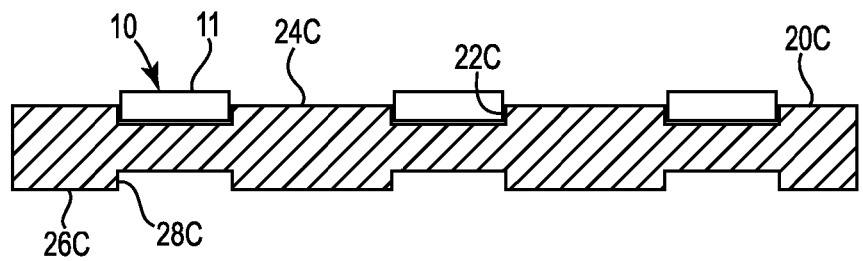
FIG. 6 is a cross-sectional view of sliders and an alternate embodiment of a tray.
Figure 7:
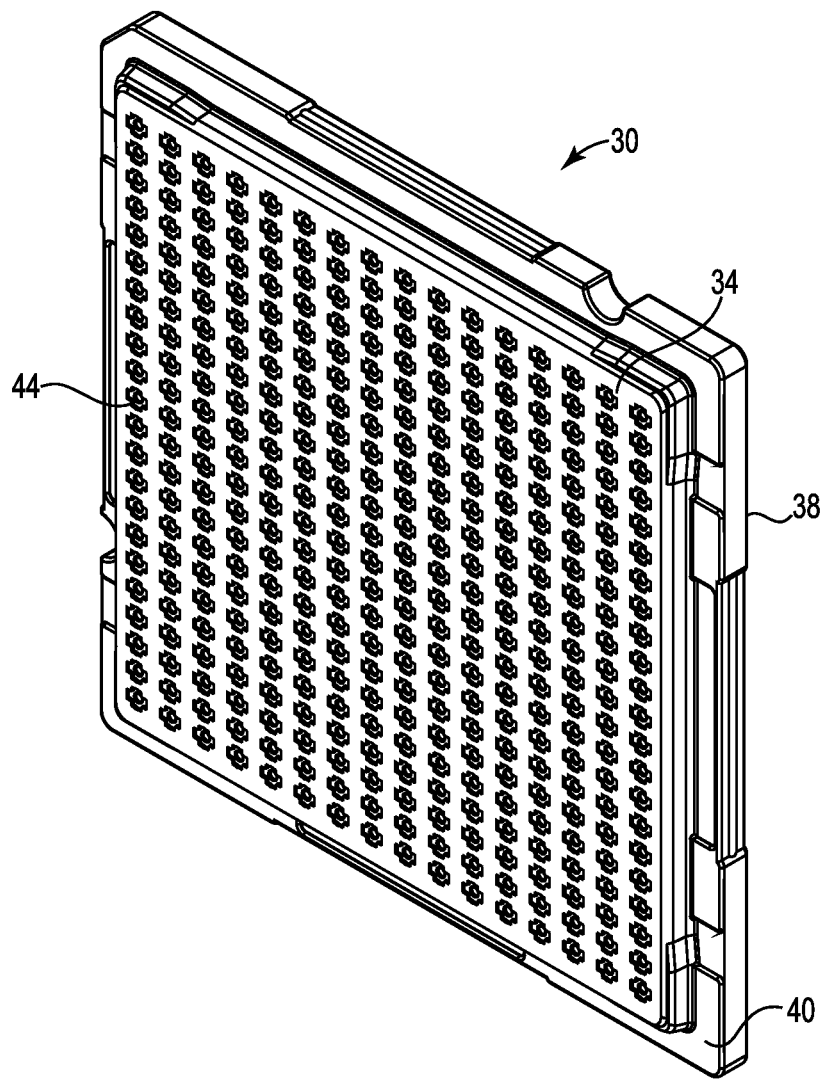
FIG. 7 is a perspective view of another embodiment of a tray.
Figure 8:
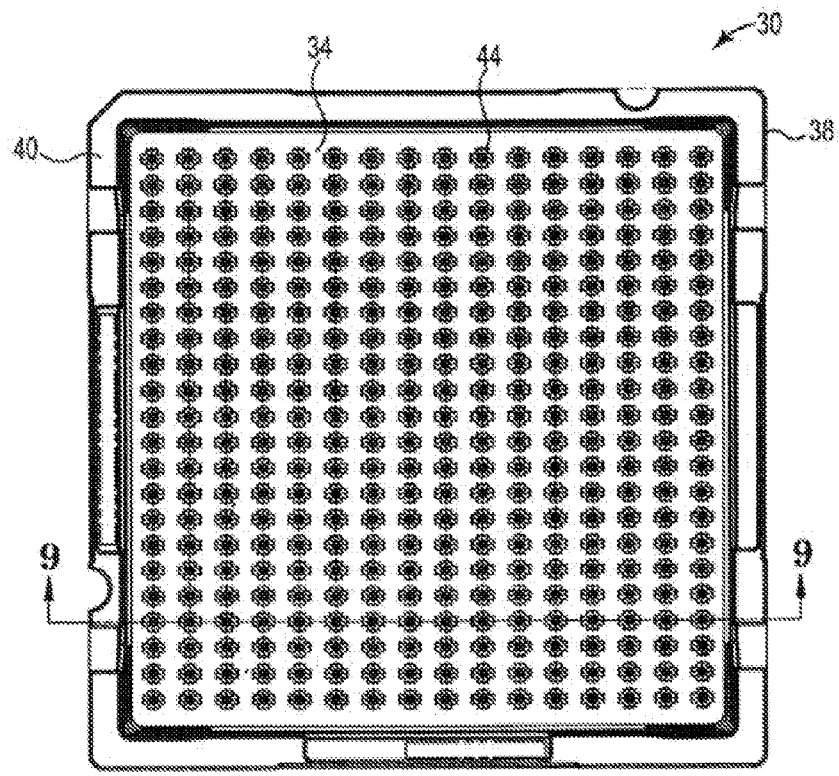
FIG. 8 is a top plan view of the tray of FIG. 7.

Referring to FIG. 3, a plurality of sliders 10 is illustrated, packaged in preparation for cleaning. Particularly, a plurality of sliders 10 is illustrated retained on or in a tray 20. At this state, each of sliders 10 has been formed, lapped, and otherwise processed so that each slider 10 has an air bearing surface, rails, and the appropriate elements to read from and write to a data track on disc 2. Contamination, such as particulate debris and/or organic or other chemical contamination or films, may be present on slider 10 at this state. Three embodiments of tray 20 are illustrated in FIGS. 4, 5 and 6 as trays 20A, 20B, 20C, respectively. Each tray has a plurality or recesses or cavities therein, each cavity having a length, width and depth configured to retain a slider therein. The cavities are oriented in a plurality of rows and columns.

Turning to FIG. 4, tray 20A includes a plurality of cavities 22A in which sliders 10 are retained. Sliders 10 are recessed in tray 20A with top surface 11 of slider 10 non-level or non-planar with an upper surface 24A of tray 20A. Opposite upper surface 24A is a back or lower surface 26A. In the embodiment of FIG. 4, slider 10 is fully retained and recessed in cavity 22A, with top surface 11 of slider 10 approximately 50 to 100 micrometers below upper surface 24A of tray 20A.

In the embodiment of FIG. 5, slider 10 is fully retained in the cavity, but is not recessed into the cavity. In FIG. 5, tray 20B has a plurality of cavities 22B in which are positioned sliders 10. Top surface 11 of slider 10 is positioned level or planar with upper surface 24B of tray 20B. In this configuration, brushes or mechanical mechanisms can be used to clean top surface 11 of slider 10. Opposite upper surface 24B is a lower surface 26B also having a plurality of cavities or recesses 28B therein. Each recess 28B corresponds with one cavity 22B and is aligned therewith. In this embodiment, recesses 28B have a width wider than the width of cavities 22B. Recesses 28B facilitate stacking of multiple trays 20B having sliders 10 in cavities 22B.

In the next embodiment, FIG. 6, slider 10 is retained in the cavity, but a portion of slider 10 extends out from the cavity. In FIG. 6, tray 20C has a plurality of cavities 22C in which are positioned sliders 10. Top surface 11 of slider 10 is positioned above upper surface 24C of tray 20C; that is, slider 10 extends above upper surface 24C of tray 20C. In this configuration, brushes or mechanical mechanisms can be used to also clean top surface 11 of slider 10 and also possibly side surfaces of slider 10. Opposite upper surface 24C is a lower surface 26C also having a plurality of cavities or recesses 28C therein. Each recess 28C corresponds with one cavity 22C and is aligned with the cavity. In this embodiment, recesses 28C have a width the same as or essentially the same as the width of cavities 22C. Recesses 28C facilitate stacking of multiple trays 20C having sliders 10 in cavities 22C.

FIGS. 7 through 10 show another embodiment of a tray suitable both as a cleaning tray and as a carrier tray, the tray having cavities or recesses on both the upper surface and the bottom surface. Recesses on the bottom surface align with cavities on the top surface, thus facilitating stacking of multiple trays with sliders held therein.

Figure 9A:
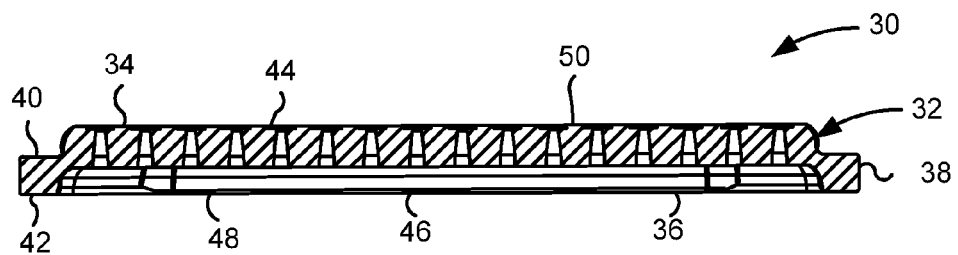
FIG. 9A is a cross-sectional view taken along line 9-9 of FIG. 8.
Figure 9B:
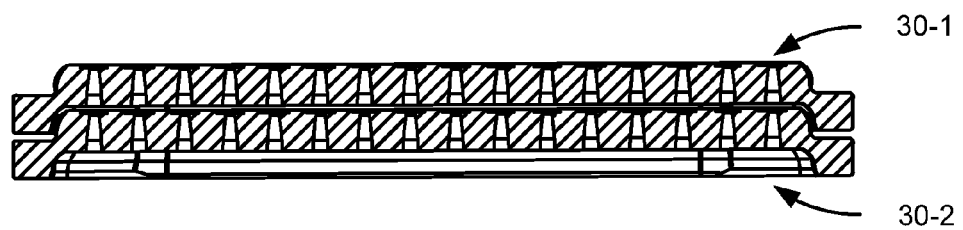
FIG. 9B illustrates two of the trays of FIG. 8 stacked in cross-sectional view.
Figure 10:
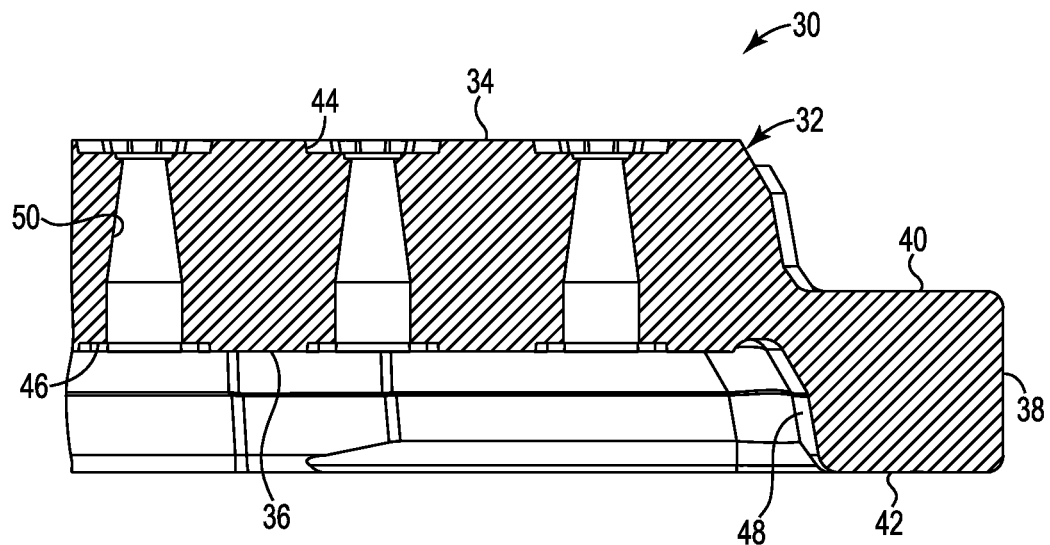
FIG. 10 is an enlarged view of a portion of FIG. 9.

Shown in these figures, tray 30 has a planar body 32 forming a central section having a top surface 34 and an opposite bottom surface 36, body 32 having an outer perimeter 38 and a perimeter flange 40. Top surface 34 is elevationally above the top surface of flange 40, as best seen in FIGS. 9A and 10. Flange 40 also has a lower surface 42 that is the overall bottom surface of tray 30. Lower surface 42 includes a large recessed area 48 (recessed toward top surface 34) that forms bottom surface 36; lower surface 42 is not planar with bottom surface 36, as best seen in FIGS. 9 A and 10, however in alternate embodiments, no recessed area 48 is present so that lower surface 42 is planar with bottom surface 42.

Top surface 34 has a plurality of cavities 44 therein, each for receiving a slider therein. In this embodiment, cavities 44 have a depth of 150 micrometers, although in other embodiments, cavities 44 can have a depth of 100-200 micrometers, depending on the thickness of the slider to be held by tray 30 and the height of the slider desired to extend out from cavity 44. In some embodiments, cavities 44 have a depth of no more than 180 micrometers, in other embodiments no more than 150 micrometers or no more than 100 micrometers. In order to obtain adequate retention of the slider in cavity 44 during the cleansing process and/or the transport process, no more than 50% of the height of the slider extends above the top surface of the tray and out from the cavity, when a slider is present in cavity 44. In other embodiments, no more than 40% of the height of the slider extends above the top surface. In some embodiments, no more than 100 micrometers or 75 micrometers of the slider extends above the top surface or the tray, in other embodiments, no more than 50 micrometers or 25 micrometers. In some embodiments, such as illustrated in FIG. 5, the slider is level or planar with top surface 34.

Bottom surface 36 of tray 30 also has a plurality of recesses or cavities 46 therein, which facilitate stacking of multiple trays having the sliders retained therein. When multiple trays 30-1, 30-2 are stacked as shown in FIG. 9B, top surface 34 of a first tray will contact bottom surface 36 of a second tray, top surface 34 of the second tray will contact bottom surface 36 of a third tray, and so on. (It is noted that when multiple trays 30 are stacked, the top surface of flange 40 of a first tray may or may not contact lower surface 42 of a second tray, and so on). Recess 46 in bottom surface 36 is configured to accommodate any protrusion of the slider above the top surface of the adjacent tray. The depth of recess 46 is at least 75 micrometers, in other embodiments at least 100 micrometers, in other embodiments at least 125 micrometers, and could be as much as 150 micrometers or more.

In this embodiment of tray 30, a passage 50 provides fluid communication between upper cavity 44 and recess 46 in bottom surface 36. Passage 50 may be used, for example, to pull a vacuum to better hold the slider in cavity 44, or may be used to increase the circulation of cleaning fluid (e.g., washing liquid) to and around the slider.

Figure 11:
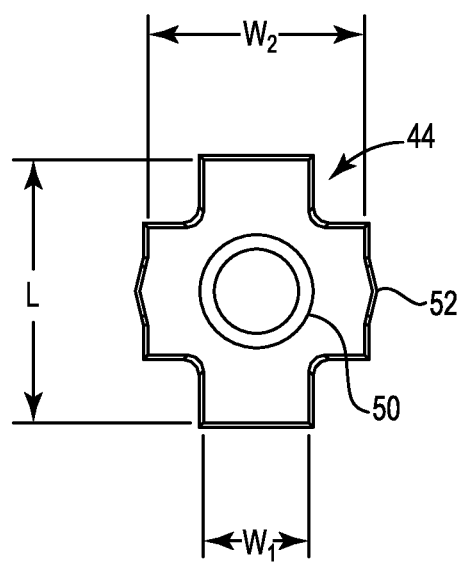
FIG. 11 is an enlarged top plan view of a cavity from the tray of FIGS. 7 and 8.

As indicated above, a slider to be retained by the tray (e.g., tray 20A, 20B, 20C, 30) may have side dimensions, for example, of between 700 and 1250 micrometers for its length and/or width, and a height of 180-230 micrometers. FIG. 11 illustrates a cavity 44 from tray 30; fluid passage 50 is seen centered in the bottom wall of cavity 44. Cavity 44 has a length of L and a nominal width of $W_1$. In some embodiments, cavity 44 may be sized to provide a small distance of clearance between the slider and the cavity walls; that is, cavity is slightly larger than the slider. Any clearance is less than 50 micrometers per side, and in some embodiments about 40 micrometers per size. For example, for a slider having a length of 1235 micrometers and a width of 770 micrometers, cavity 44 can have a length L of 1310 micrometers and a nominal width $W_1$ of 850 micrometers.

Cavity 44 can include a region 52 on a side of cavity 44, greater than the clearance distance discussed above, to facilitate insertion and removal of a slider from cavity 44. Region 52 is present beyond the nominal width $W_1$ of cavity 44 and is shaped and sized to allow tweezers or other equipment to be inserted into cavity 44 when a slider is positioned therein and to grasp the sides of the slider. In the illustrated embodiment, region 52 is present on two opposite sides of cavity 44. Taking region 52 into consideration, cavity 44 has an overall width of about $W_2$, where $½*(W_2-W_1)$ is the width of region 52 past the slider on each side of the slider. Although not needed because the slider is present in cavity 44 on top surface 34, recess 46 in bottom surface 36 could include a mirror region 52 of cavity 44.

Similar to the cavities, the tray (e.g., tray 20A, 20B, 20C, 30) can be specifically shaped and sized depending on the particular slider to be washed and/or carried by the tray and/or on the particular processing equipment. A common size for cleansing and/or carrier trays is 2 inches×2 inches (about 5 cm×5 cm), although larger and smaller trays can be used. The cavities/recesses of the tray are preferably arranged in orderly rows and columns; tray 30 of FIGS. 7 and 8 includes 22 rows and 16 columns, thus having 352 cavities/recesses. Other embodiments of trays may have, for example, as many as 500 or 600 cavities/recesses.

The tray (e.g., tray 20A, 20B, 20C, 30) may be formed from any suitable material, but preferably from a polymeric material, due to ease of manufacturing by molding (e.g., injection molding). A preferred material is PEEK (polyether ether ketone), although other material such as PETE (polyethylene terephthalate), polycarbonate, polyester, etc. could be used.

It is understood that numerous variations of the trays and methods of making the trays could be made while maintaining the overall inventive design and remaining within the scope of the disclosure. Numerous alternate design or element features have been mentioned above. For example, the tray may include channels on the top surface and/or bottom surface of the tray, in some embodiments connecting the cavities on the top surface or the recesses in the bottom surface. Such channels may increase the circulation of cleaning fluid (e.g., washing liquid) to and around the sliders.

Thus, various embodiments of the SLIDER CLEANING AND CARRIER TRAY are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A tray for retaining sliders, the tray comprising: a planar body comprising a top surface having a plurality of cavities therein, an opposite bottom surface having a large recessed area with a plurality of recesses therein, and a perimeter flange defining the bottom surface, each cavity oppositely aligned with a respective recess, with each cavity and its respective recess connected by a passage through the body.

2. The tray of claim 1 wherein each cavity in the top surface has a depth of no more than 180 micrometers.

3. The tray of claim 1 wherein each cavity in the top surface has a depth of no more than 150 micrometers.

4. The tray of claim 1 wherein each recess in the large recessed area has a depth of at least 100 micrometers.

5. The tray of claim 1 wherein each cavity has a nominal width and a length, and each recess has a width and a length, and wherein the nominal width of each cavity is the same as the width of each recess.

6. The tray of claim 1 wherein each cavity has a nominal width and a length, and each recess has a width and a length, and wherein the length of each cavity is the same as the length of each recess.

7. The tray of claim 1 wherein each cavity has a nominal width and a length, and an overall width.

8. The tray of claim 1 wherein each cavity has a nominal width and a length of no more than 1350 micrometers.

9. A tray for sliders comprising:
a planar body comprising:
a top surface having a plurality of cavities therein, each cavity having a length no more than 1350 micrometers, a nominal width no more than 1350 micrometers, and a depth no more than 180 micrometers,
an opposite bottom surface having a large recessed area with a plurality of recesses therein, each recess having a length no more than 1350 micrometers, a width no more than 1350 micrometers, and a depth of at least 100 micrometers, each recess oppositely aligned with a respective cavity,
with a plurality of passages through the body, each passage fluidly connecting a recess with its respective cavity.

10. The tray of claim 9 wherein the nominal width of each cavity is the same as the width of each recess.

11. The tray of claim 9 wherein each cavity has an overall width greater than the nominal width.

12. The tray of claim 9 wherein the length of each cavity is the same as the length of each recess.

13. The tray of claim 9 wherein each cavity in the top surface has a depth of no more than 150 micrometers.

14. The tray of claim 9 wherein each recess in the large recessed area has a depth of at least 125 micrometers.

15. A stack of trays comprising:
a first tray comprising a planar body, a top surface having a plurality of cavities therein, an opposite bottom surface having a large recessed area with a plurality of recesses therein, and a perimeter flange defining the bottom surface, each recess oppositely aligned with a respective cavity;
a second tray comprising a planar body, a top surface having a plurality of cavities therein, an opposite bottom surface having a large recessed area with a plurality of recesses therein, and a perimeter flange defining the bottom surface, each recess oppositely aligned with a respective cavity, the second tray stacked on the first tray in a manner that the top surface of the second tray is adjacent the bottom surface of the first tray; and
at least one slider having a top surface and a bottom surface, the slider positioned in a cavity of the first tray with the bottom surface seated within the cavity and the top surface extending above the top surface of the planar body of the first tray and into the recess in the large recessed area of the second tray.

16. The stack of trays of claim 15, wherein each of the first tray and the second tray further comprises a plurality of passages through its body, each passage fluidly connecting a recess with its respective cavity.

* * * * *